N. PEMBERTON-BILLING.
MOTION PICTURE APPARATUS.
APPLICATION FILED JAN. 12, 1921.
1,391,341.
Patented Sept. 20, 1921.
4 SHEETS—SHEET 1.
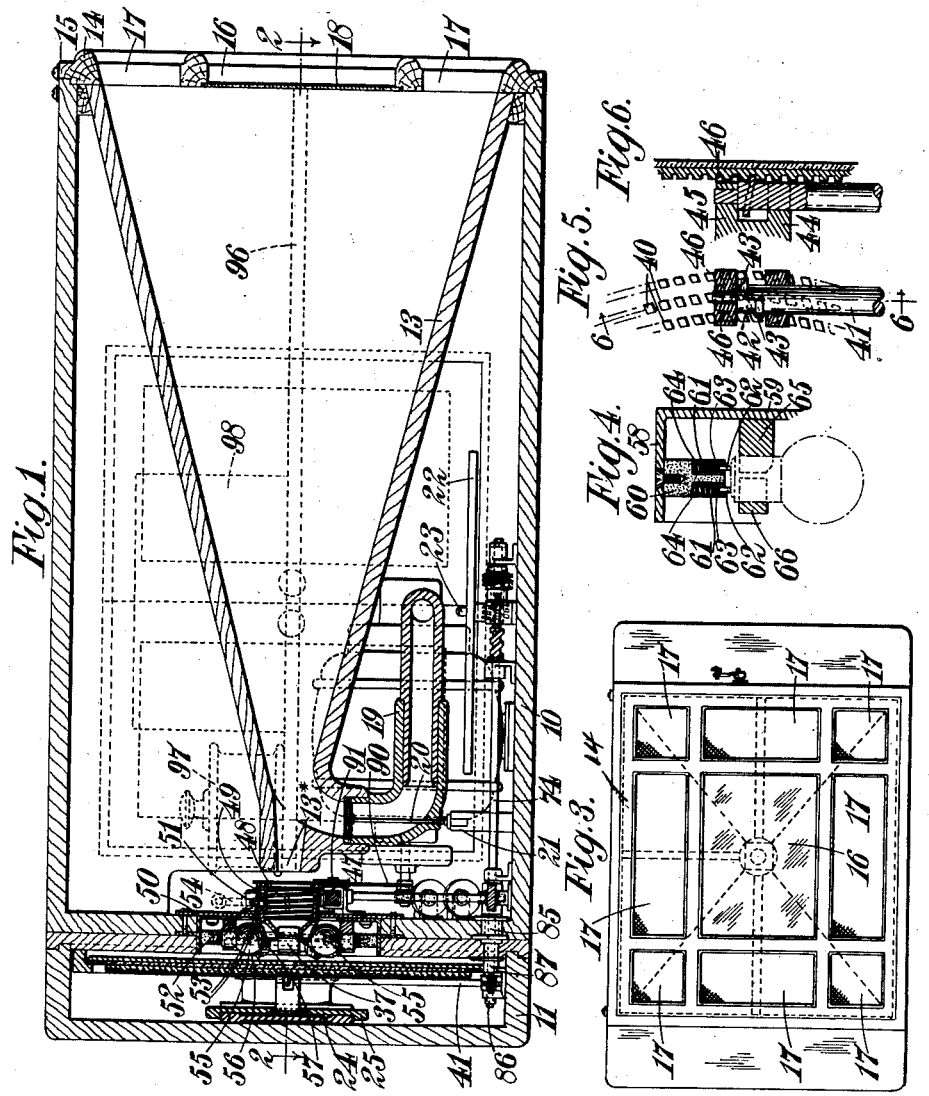

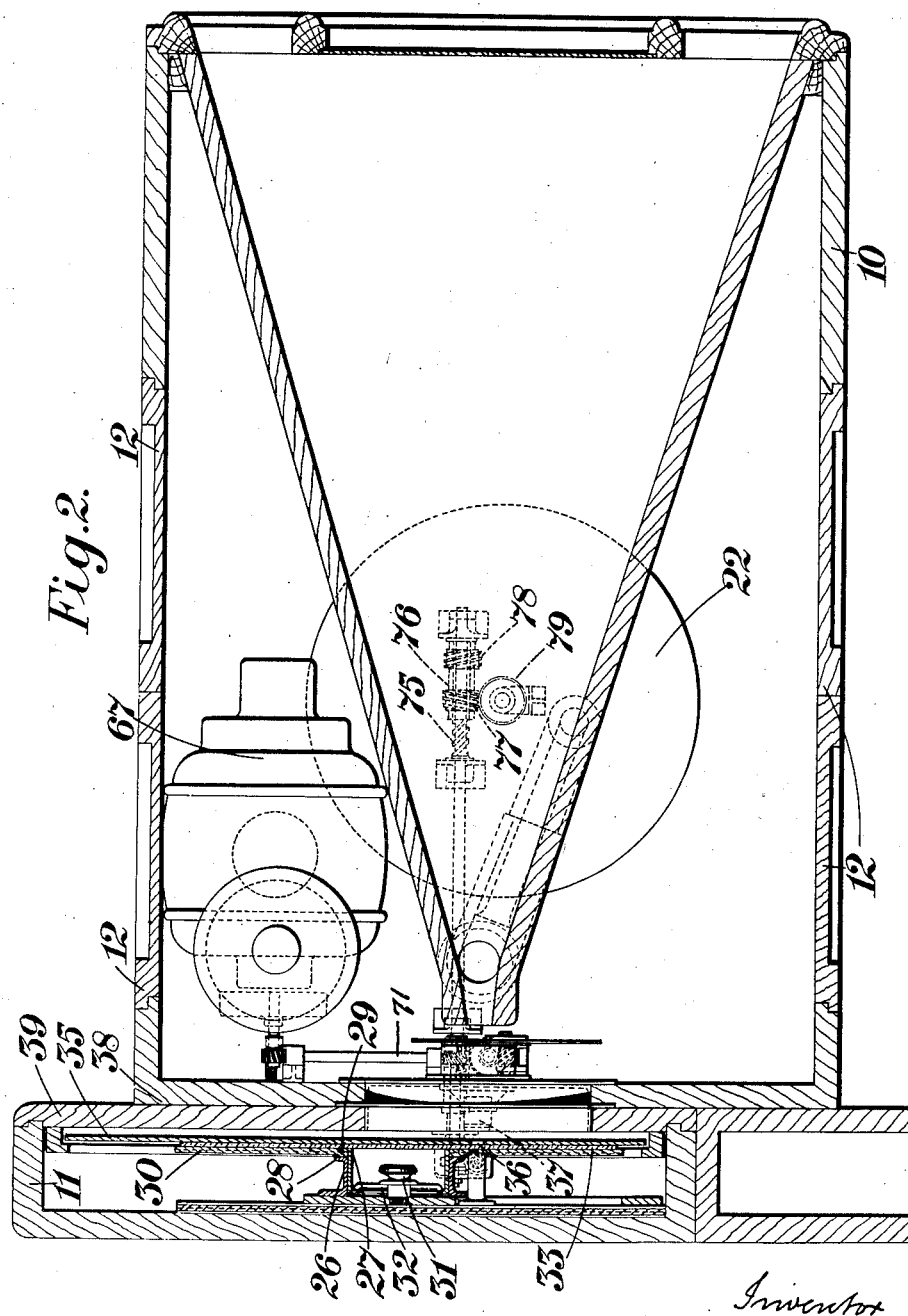

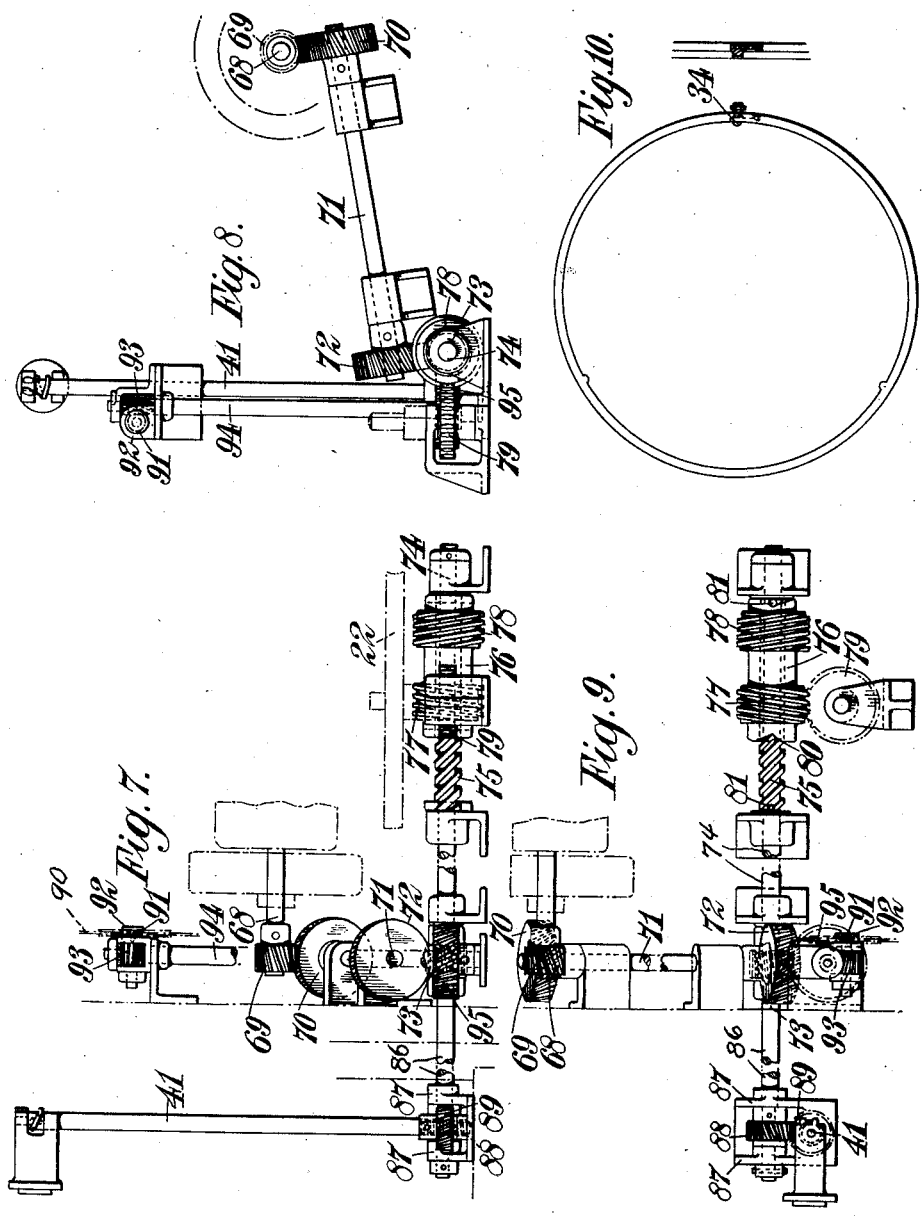

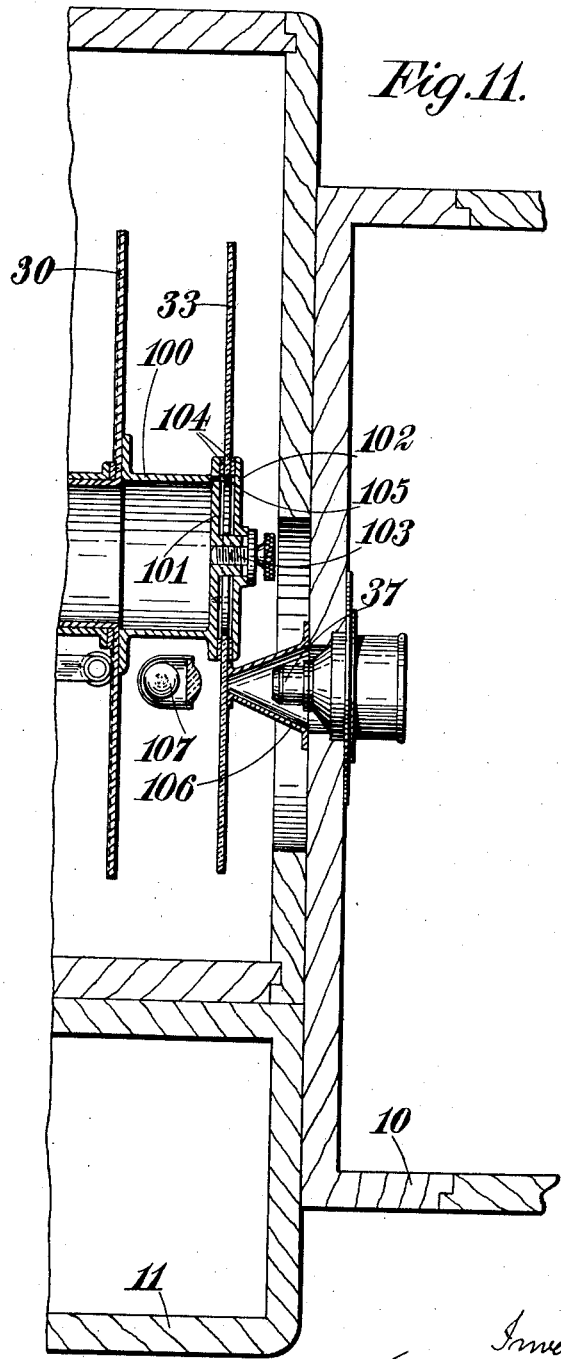

UNITED STATES PATENT OFFICE.

NOEL PEMBERTON-BILLING, OF HERTFORD, ENGLAND.

MOTION-PICTURE APPARATUS.

1,391,341.  Specification of Letters Patent.  Patented Sept. 20, 1921.

Application filed January 12, 1921. Serial No. 436,743.

*To all whom it may concern:*

Be it known that I, NOEL PEMBERTON-BILLING, a subject of the King of England, residing in Hertford, England, have invented certain new and useful Improvements in Motion-Picture Apparatus, (for which I have filed applications in Great Britain as follows, No. 186, filed Jan. 2, 1920; No. 708, filed Jan. 8, 1920; No. 906, filed Jan. 10, 1920; No. 11,932, filed Apr. 29, 1920,) of which the following is a specification.

This invention is for improvements in or relating to motion-picture apparatus and in one form of the invention to a combined motion-picture apparatus and talking-machine.

Motion-picture apparatus according to the present invention is characterized by a series of pictures mounted on a rigid support and arranged in successive phase relationship in the form of a spiral or a helix or other figure lying in a continuous band on the support, combined with a projector device to project the pictures in succession on to a screen by means of transmitted or reflected light.

One feature of the invention comprises means to impart relative movement between the picture-support and the projector device such that either (*a*) the picture-support is moved to present the pictures in succession to the projector device, or (*b*) the projector device is moved across the picture-support as the latter is rotated. By the relative movements between the picture-support and the projector device that portion of the support presented step-by-step to the lens is a spiral or helical portion.

Conveniently there is provided a screen maintained in fixed relation with the projector device, the said screen comprising part of the structure of the apparatus.

According to another feature of the invention the picture-support bearing the pictures on one face of it is mounted for rotation and for translation across the axis of projection and has on its opposite face ratchet-teeth arranged in spiral or other form corresponding with the form of the picture-band, combined with a toothed driving member which meshes with the teeth, is rotatable about a fixed axis and is restrained from endwise movement, a spiral or other guide corresponding with the form of the picture-band on the support and means to engage said guide. The purpose of such a combination is that as the driving member is rotated the picture-support will be also rotated about its axis and during rotation the guide will serve to move the support bodily to present the pictures in the desired manner to the projector device.

In a preferred form the toothed driving member comprises a cam rotatable about a fixed axis to engage with the teeth on the carrier and formed as a partial convolution of a worm continued at one (or at each) of its extremities in a portion that is directed in a plane at right-angles to the axis of rotation. By means of a cam so formed the carrier will, during each revolution of the cam, be first advanced a step by the worm and thereafter be held stationary by the contiguous trailing end portion directed at right-angles to the axis of rotation. If a similar portion be provided at the leading end of the worm it will serve to lead the worm into a toothed gap in advance of that in which the trailing end portion is engaged. Thus, a step-by-step advance of the carrier is obtained and the latter is held immovable during the periods in which it is not being advanced by the worm.

The invention also includes the combination with a motion-picture apparatus of a talking-machine and an operative connection between the moving parts of the talking-machine and the motion-picture apparatus such that movement depicted on the screen of the latter is synchronized with the sounds emanating from the talking-machine.

Further, the invention includes a camera for the obtaining of pictures suitable for the motion-picture apparatus hereinbefore referred to and also a portable unit comprising in combinaton a motion-picture apparatus and a talking-machine.

The foregoing and other features of the invention will be more clearly understood from the following description which is that of one preferred form of the invention described in detail by way of example and illustrated in the accompanying drawings, in which—

Figure 1 is a central sectional elevation in a plane containing the optical axis of the projector device;

Fig. 2 is a section on the line 2—2 of Fig. 1;

Fig. 3 is an end view looking from the right of Fig. 1 on a reduced scale;

Fig. 4 is a detailed sectional view of a portion of the lighting device;

Fig. 5 is a detail of the driving mechanism for the picture-support;

Fig. 6 is a section on the line 6—6 of Fig. 5;

Fig. 7 is a detail view of the gearing employed in the appartus viewed as in Fig. 1, with the other parts of the apparatus removed;

Fig. 8 is a view looking from the right of Fig. 7;

Fig. 9 is a plan of Fig. 7.

Fig. 10 is a detail view showing the carrier for the picture-record and the means for locating the latter securely on the carrier, and Fig. 11 is a section similar to that of Fig. 2 of a portion of a modified form of apparatus.

Like reference numerals indicate like parts throughout the drawings.

The apparatus illustrated comprises a combined motion-picture apparatus and talking machine. The case of the apparatus as a whole is in two main portions comprising a main body 10 and at one end a detachable box-like structure 11.

The part 10 is formed as a cabinet having at two opposite sides doors 12 hinged or otherwise secured in position to give access to the interior of the case 10. Within the latter is a horn 13 which, as will be explained more fully hereinafter, serves to project the sound from the instrument and also as the projector tube for the motion-picture apparatus.

The flared end of the horn 13 terminates at one end of the case and at this end a cover 14 is secured conveniently by swinging or other detachable clips 15. The part 14 is shown more clearly in Fig. 3 as made up of a frame having crossed partitioning members which afford a central opening 16 and a plurality of marginal openings 17. The latter are covered preferably with open-mesh material such as silk gauze, whereas the central opening 16 has secured within it a translucent screen 18 centrally disposed in relation to the axis of the horn 13. Pivotally secured to one end of the horn is a tone-arm 19 similar to the known corresponding portions of talking-machines, and to this tone-arm will be secured in known manner a sound-box which, however, for the sake of clearness is not illustrated. The tone-arm is mounted to swing about a pivot 20 supported in a block 21.

Beneath the tone-arm is a turntable or record support 22 mounted for rotation on a pivot 23 which latter is carried in bearings supported on the base of the case 10. Within the end portion 11 and secured to the back of it, is a fixed guide 24 extending transversely across the back. On this guide is a slide or saddle 25. To the slide 25 is secured, by bolting or otherwise, an outer sleeve 26. An inner sleeve 27 makes a sliding fit within the outer sleeve 26 and at their outer ends the two sleeves are formed with flanges 28 and 29. A carrier 30 for a picture-record is gripped between the flanges 28 and 29, the sleeve 27 constituting a bearing on which the carrier 30 can rotate. The sleeve 27 is secured within the sleeve 26 by means of a bolt 31 which screws into the slide 25 and engages an inturned flange on the sleeve 27 by means of an integral or separate flange 32. The bolt 31 can be screwed home to the required degree of tightness to hold the parts firmly together but to allow, however rotation of the carrier 30 about its axis which is co-axial with that of the bolt 31.

The carrier 30 is a circular plate formed with a marginal flange and is formed to receive a circular record 33 which bears on it the pictures to be projected. As shown in Fig. 10, there are conveniently three spring-pressed detents 34 located within recesses in the flange of the carrier 30 and these detents present semi-circular edges to engage within corresponding recesses formed in the edge of the material of the picture-record or backing so that as the carrier 30 is rotated, the record 33 will also be rotated without slip occurring between the two parts.

Covering the picture-record 33 is a velvet or other screen 35 secured in any convenient manner within the structure 11. The screen 35 has an orifice in it at 36 co-axial with the axis of the horn and between the orifice 36 and the end of the horn is a lens 37 through which pictures presented behind the orifice 36 will be projected on to the screen 18. The structure 11 secured in any convenient manner to the end of the casing 10 and joins it in the plane numbered 38. The structure 11 is itself formed with a removable lid 39 which may be removed after the structure has been removed from the case 10 to enable the picture-record to be placed on the carrier 30.

On the back of the carrier 30 are ratchet-teeth 40 arranged in spiral form and portions of three convolutions of the ratchet-teeth are shown in detail in Fig. 5. The pictures on the picture-record are also arranged in succession as a spiral band which corresponds exactly with the spiraling of the teeth on the back of the carrier 30. The ratchet-teeth are so spaced apart that there is one tooth for each picture on the picture-record. Thus a step-movement of one tooth of the carrier advances the picture-record a distance equivalent to one picture. It will be appreciated that if the carrier is advanced a tooth at a time so as to rotate it about its axis, and is at the same time moved transversely across the axis of the orifice 36, the pictures will be presented to the orifice in succession following along the spiral of the band in which they are arranged. Bodily movement of the carrier transversely across the axis of the orifice 36 is obtained by movement of the slide 25 on the guide 24 and the mechanism for effecting the combined rotation and translation of the carrier will now be described.

On a spindle 41 is a toothed driving member in the form of a cam comprising a partial convolution of a worm 42 terminating in two end portions 43 which are in places at right-angles to the axis of the spindle 41. The tooth comprising the parts 42 and 43 engages between adjacent pairs of the ratchet-teeth 40 and it will be seen that during each revoltion of the spindle 41 the pitched worm portion 42 will advance the carrier a step equivalent to the pitch of the teeth 40 and will thereafter hold the carrier stationary by the contiguous trailing end portion 43 engaging between the teeth 40. The leading end portion 43 will serve to lead the worm into a toothed gap in advance of that in which the trailing end portion is engaged.

Thus a step-by-step advance of the carrier is effected and between the step movements the carrier is held immovable.

The end of the spindle 41 is carried in a bearing having two arms 44 and 45, as shown in Figs. 5 and 6, the arm 45 having projecting lugs 46 which embrace the side surfaces of the teeth 40 to serve as a guide therefor. Thus, as the carrier is rotated the lugs 46, which are stationary, will, by their engagement with the side surfaces of the teeth 40, effect translation of the carrier bodily across the axis of the orifice 36, that is to say across the optical axis of the lens 37.

The lens is mounted in a tubular carrier 47 and is normally spring-pressed by means of a spring 48 in a direction toward the picture-support. The sleeve 47 is mounted within an outer sleeve 49 secured to a plate 50 on the end wall of the cabinet 10. Extending laterally through the cabinet is a spindle 51 bearing at its inner end an arm 52 which engages between projections 53 extending from the sleeve 47 so that as the spindle 51 is rocked by means of the handle 54 the sleeve 47 can be moved to adjust the position of the lens in relation to the pictures behind the orifice 36 for the purpose of focusing the pictures on to the screen 18.

In order to illuminate the picture a plurality of incandescent electric lamps 55 is provided, each of which is incased in a metal casing 56 which serves as a reflector and directs the light through an orifice 57 on to the picture presented at the orifice 36.

The carrier for the lamps is shown more clearly in Fig. 4 and comprises a ring 58 formed as a flange from a plate 59 secured to the plate 50. Within the ring 58 is an inwardly-extending ring 60 of insulating material and let into the inner periphery of the ring 60 are two metal rings 61 separated from one another by a layer of insulation. Above each lamp the rings 61 are orificed to receive pins 62 having enlarged heads 63 which are engaged by springs 64 within the orifices in the rings 61. The rings 61 are connected with the two poles of a source of electrical energy, the pin 62 constituting spring-pressed pins similar in their action to those commonly found in lamp-holders. The lamps themselves are held in position by means of a ring 65 secured to the plate 59 and a second ring 66 secured in any convenient manner to the ring 65 so that the necks of the lamps are held tightly between the rings 65 and 66.

The drive for the apparatus is as follows:—

An electric motor 67 has secured to its spindle 68 a pinion 69 which meshes with a pinion 70 secured to the end of a cross-shaft 71. At the other end of the shaft 71 is another pinion 72 meshing with a pinion 73 secured to the end of a spindle 74 which constitutes the common driving shaft for the record turntable 22 and the driving spindle 41 of the picture-support or carrier.

At one end the spindle 74 is formed with a quick-thread 75 which engages a correspondingly internally-threaded sleeve 76 bearing at opposite ends left- and right-handed worms 77 and 78 respectively. Either one or the other of these worms meshes with a worm-wheel 79 secured to the spindle 23 of the turntable 22. The sleeve 76 is notched at its ends at 80 to engage with pins 81 on the spindle 74. The teeth on the worm-wheel 79 are so cut that they are capable of engagement with either the left- or right-handed threads 77 or 78 as the case may be.

At its other end the spindle 74 terminates in a socket 85 journaled in the end wall of the cabinet 10. The section of the socket 85 is preferably D-section and to engage within it the end of a spindle 86 carried in bearings 87 may be similarly shaped. On the spindle 86 is carried a pinion 88 meshing with another pinion 89 secured to the spindle 41.

A hit-and-miss shutter 90 is disposed between the lens and an open end 13* of the horn 13. This shutter is mounted on a spindle 91 having on it a pinion 92 meshing with another pinion 93 carried on the end of a shaft 94. At its lower end the shaft 94 has on it a pinion 95 meshing with the pinion 73.

Of the other details of the apparatus it will be seen that on one side of the horn a horizontal partition 96 divides that side of the cabinet into two portions, in the lowermost of which is the motor, while in the upper portion on the partition 96 is supported a starting rheostat 97 for the motor and an accumulator or other source of electrical energy 98.

The operation of the apparatus is as follows:—

A sound-record is placed on the turntable 22 through the doors 12 shown in the lower side of Fig. 2. A picture-record is also placed on the carrier 30 and is gripped thereon by the detents 34. The structure 11 is then replaced and clipped in any convenient manner to the end of the cabinet 10 so that the end of the shaft 86 is engaged within the socket 85. The motor is then started up, driving the spindle 74 through the gearing previously referred to, the sleeve 76 moving to one end or the other of the screwed portion 75 of the spindle 74 according to the direction of rotation of the latter. In whichever direction the spindle 74 is rotated the pinion 79 will always be rotated in the same direction by engagement either with the worm 77 or the worm 78. At the same time the spindle 74 drives the spindle 41 thus moving the carrier 30 step by step about its axis of rotation, at the same time imparting to it a movement of translation by means of the guides 46. Thus, as the sound-record is reproduced a picture-record is at the same time thrown on to the screen 18 by means of reflected light from the lamps 55. The speed of rotation of the turntable 22 is synchronized with the speed at which the pictures are brought successively in front of the orifice 36 so that the moving picture thrown on to the screen is synchronized with the sounds emanating from the sound-record. The shutter 90 operates on the hit-and-miss principle in the manner well understood to close the orifice 36 at the time that one picture is being changed for the next.

The same apparatus can be used as a camera, for example by replacing the frame 14 with an adjustable focusing lens-carrying plate and by removing the lens 37. Thus, assuming that a picture is required to conform with any desired sound-record the latter is placed on the turntable and a photographically sensitized surface is presented to the orifice 36 as a surface covering a backing such as 33. Supposing the sound-record to be that of a song, a person standing before the camera can go through the motions which should accompany the words of a song so that a picture-record is photographed on to the sensitive surface carried on the backing 33, the gestures of the person being made to correspond with the words issuing from the sound-record.

It will be obvious that although a song and motions accompanying a song have been described above, the apparatus can be employed for any purpose in which a moving picture can harmonize with a musical or other sound reproduction.

Moreover, it is not essential that the apparatus be employed as a combined motion-picture and talking-machine apparatus as the motion-picture portion used either as a camera for photographing a series of pictures or as a motion-picture reproduction apparatus can be used by itself.

Assuming that the motion-picture portion of the apparatus (or the camera) has been used in connection with a spiral of pictures starting from near the center of the picture-record and finishing at the outer periphery thereof, it may be desirable to reproduce (or photograph) the next picture starting from the outer periphery of the spiral and working inward. This can be done by reversing the direction of rotation of the motor. If the combined apparatus is to be used in this way, it is undesirable that the direction of rotation of the sound-record support 22 be reversed and it is for this reason that the sleeve 76 is provided. Thus, assuming that the worm 77 has been engaged with the worm-wheel 79 when a picture-record has been working from the inner to the outer periphery of the spiral, a reversal of the direction of drive will, by means of the quick-thread 75, draw the worm 78 into engagement with the worm-wheel 79 so that although the main drive has been reversed in direction, the rotation of the worm-wheel 79 remains always the same. Any other form of reversing drive may be employed, that described in detail being given by way of example only, as indeed is the whole construction of the apparatus. It may be desirable to insert a clutch-device in the drive for the picture-record carrier so that this drive may be thrown into and out of operation as desired without stopping the drive for the other parts. On the other hand this may be effected by holding the box-structure 11 away from the cabinet 10 so that the spindle 86 is not engaged within the socket 85 until the required moment at which it is desired to commence the movement of the picture-record.

It will be appreciated that in the gearing illustrated a helical form of gearing has been contemplated although many other preferred forms of gears may be employed.

The modified form of apparatus illustrated in Fig. 11 is constructed for the projection of the pictures by transmitted instead of reflected light. For the purpose of illustrating the modifications, only those portions of the apparatus which have been modified are shown. The body of the cabinet 10 and the end box-like structure 11 remain as before with the exception that the box 11 will be deeper than in the previous example.

The disk 30 is mounted on the back of the box, and is formed with ratchet-teeth and driven in the manner hereinbefore described, but the marginal flange is not necessary. To the face of the disk 30 is secured by riveting or other convenient means a similarly disposed tubular boss 100 having a closed end 101. The glass or other transparent support for the picture record is held to the closed end 101 by a plate 102, and the clamping screw 103. Felt or other washers 104 are provided on each side of the support 33, and the latter is keyed to the boss 100 by means of pins 105 engaging corresponding recesses on the inner periphery of a central opening formed in the support 33.

Secured in the end wall of the cabinet is the lens 37 and its carrier, which can be adjusted in the manner previously described, and coaxial with the lens is a conical projector tube 106, the smaller end of which is adjacent to and either just clear of or in light contact with the surface of the picture support. The purpose of the projector tube 106 is to insure that only one picture at a time will be presented to the lens 37.

A lamp 107 serves as a source of light which passes through the transparent support 33, and the picture thereon which is presented in any particular instant to the projector tube 106.

What I claim as my invention and desire to secure by Letters Patent is:—

1. A device of the class described, including in combination, a picture supporting member having a continuous band of pictures on one side thereof and mounted for both rotary and lateral movement, said support having ratchet teeth on the opposite side thereof and lying in a continuous band corresponding in shape to the band of pictures, a toothed driving member in mesh with the ratchet teeth for effecting rotation of said support, and stationary means separate from said driving member in continual engagement with the support for effecting lateral movement thereof as it rotates.

2. A device of the class described including in combination, a picture supporting member having a continuous band of pictures on one side thereof and mounted for both rotatory and lateral movement, said support having ratchet teeth on the opposite side thereof and lying in a continuous band corresponding in shape to the band of pictures, and a member for successively engaging said teeth to impart a step by step rotatory movement to the support, said member comprising a partial revolution of the thread of a worm.

3. A device of the class described including in combination, a picture supporting member having a continuous band of pictures on one side thereof and mounted for both rotatory and lateral movement, said support having ratchet teeth on the opposite side thereof and lying in a continuous band corresponding in shape to the band of pictures, and a member for successively engaging said teeth to impart a step by step rotatory movement to the support, said member comprising a partial revolution of the thread of a worm which has an extension at one end disposed in a plane at right angles to the axis of rotation of said member.

4. A device of the class described including in combination, a picture supporting member having a continuous band of pictures on one side thereof and mounted for both rotatory and lateral movement, said support having ratchet teeth on the opposite side thereof and lying in a continuous band corresponding in shape to the band of pictures, and a member for successively engaging said teeth to impart a step by step rotatory movement to the support, said member comprising a partial revolution of the thread of a worm which has an extension at each end disposed in a plane at right angles to the axis of rotation of said members.

In testimony whereof I affix my signature.

NOEL PEMBERTON-BILLING.